United States Patent [19]

Hooper et al.

[11] Patent Number: 4,908,284

[45] Date of Patent: Mar. 13, 1990

[54] SOLID STATE BATTERIES

[75] Inventors: Alan Hooper, Oxfordshire; John M. North, Berkshire; Robin J. Neat, Oxfordshire, all of England

[73] Assignee: Dowty Electronic Components Limited, Buckinghamshire, United Kingdom

[21] Appl. No.: 206,350

[22] Filed: Jun. 14, 1988

[30] Foreign Application Priority Data

Jun. 17, 1987 [GB] United Kingdom ............... 8714239

[51] Int. Cl.[4] ............................................. H01M 6/18
[52] U.S. Cl. .................................... 429/192; 429/213; 252/510
[58] Field of Search ............... 429/192, 191, 212, 213, 429/218; 252/518, 519, 512, 500, 182.1, 511, 510, 508

[56] References Cited

U.S. PATENT DOCUMENTS

| | | | |
|---|---|---|---|
| 4,471,037 | 9/1984 | Bannister | 429/191 |
| 4,472,487 | 9/1984 | Maxfield et al. | 429/213 X |
| 4,589,197 | 5/1986 | North | 429/192 X |
| 4,654,279 | 3/1987 | Bauer et al. | 429/192 |
| 4,687,598 | 8/1987 | Varma | 429/212 X |
| 4,728,589 | 3/1988 | MacDiarmid et al. | 429/213 |
| 4,781,443 | 11/1988 | Giles | 429/213 X |
| 4,792,504 | 12/1988 | Schwab et al. | 429/192 |

*Primary Examiner*—Anthony Skapars
*Attorney, Agent, or Firm*—Young & Thompson

[57] ABSTRACT

A material which is particularly suitable for use in a composite cathode and which includes a complex of a salt formed between a metal ion capable of existing in at least two stable valency states or an aluminium ion together with a suitable anion and a solid plastics polymeric composition capable of forming a donor acceptor type bond with the metal or aluminium ion, wherein the material exhibits both ionic and electronic conductivities to a substantial degree.

13 Claims, No Drawings

SOLID STATE BATTERIES

This invention relates to electrochemical cells and substances for use in components thereof, and is especially relevant to solid state cells for use in particular in rechargeable lithium batteries.

Electrochemical cells comprising a lithium-containing anode, a lithium ion-containing polymeric electrolyte with high ionic conductivity and a cathode containing an active catholyte together with an electronically conducting material are well known.

Cells of this type are also known with a composite cathode in which the active catholyte, for example a vanadium oxide such as $V_6O_{13}$, and the electronically conducting material are distributed throughout polymeric electrolyte material, for example a complex between polyethylene oxide, referred to hereinafter as PEO, and lithium trifluoromethane sulphonate, i.e.

$(PEO)_xLiF_3CSO_3$, the electronically conducting material, for example carbon black, forming an electronically conducting phase in the composite.

However, problems can arise from a lack of continuity of the electronically conducting phase and/or poor contact between the conducting material and the active catholyte caused by unequal distribution of the conducting material within the polymeric electrolyte.

The invention is concerned with the discovery that it would be expedient to provide a material for which a composite cathode could be formed by distributing the active catholyte in a polymeric material which incorporates the lithium ions in suitable form and which is also electronically conducting.

In accordance with the invention, there is provided a material which includes a complex of a salt formed between a metal ion capable of existing in at least two stable valency states or an aluminium ion together with a suitable anion and a solid plastics polymeric composition capable of forming a donor acceptor type bond with the metal or aluminium ion, wherein the material exhibits both ionic and electronic conductivities to a substantial degree. Preferably the ionic and electronic conductivities are comparable with each other and preferably the material of the invention provides an electronic conductivity at least equal to its ionic conductivity.

Such materials are particularly suitable for use as composite cathode materials. However they may be employed in other applications in which combined ionic and electronic conductivities are required.

In addition to aluminium, the metal ions are preferably selected from the group consisting of iron, nickel, cobalt and copper; it is possible for mixtures of such ions to be employed. Copper ions are most preferred.

With regard to the anion, this is preferably trifluoromethane sulphonate ($CF_3SO_3^-$) or perchlorate ($ClO_4^-$).

The polymeric composition is preferably polyethylene oxide or polypropylene oxide and is most advantageously the former.

Overall, the most preferred complex is formed between polyethylene oxide and copper trifluoromethane sulphonate, i.e.

$(PEO)_xCu(CF_3SO_3)_2$

With regard to the value of "x" in the above complex, this is preferably 8 or less to ensure the concentration of copper ions in the complex is sufficiently high. Complexes in which x equals 5 have been found to be useful.

Reference has previously been made in the art to the specific complex:

$(PEO)_9Cu(CF_3SO_3)_2$ in connection with its possible use as an electrolyte material, i.e. a use requiring high ionic conductivity, but it has been found that in this particular complex the electronic conductivity, as opposed to its ionic conductivity, is negligible.

The electronic conductivity of the materials of the invention may be induced or enhanced either by a simple heat treatment, for example at or above 45° C., following which the conductivity remains high or by the presence of a source of copper, for example copper metal.

In accordance with further aspects of the invention, the material of the invention preferably also includes (by mixing or otherwise) a lithium-ion containing polymeric substance, for example an electrolyte substance.

Advantageously, the lithium-ion containing substance is:

$(PEO)_xLiCF_3SO_3$ in which "x" can be varied over a range of, say, 3 to 25 and most preferably is from 8 to 10, for example 9.

In particular, electronic conductivity of such complexes can also be generated in the polyethylene oxide- or polypropylene oxide-portion of the complexes. A material in which a mixed complex:

$PEO:_xLiCF_3SO_3:Cu(CF_3SO_3)_2$ is present and in which the value of "x" can again be varied is especially preferred.

The materials of the invention and in particular those including a lithium-ion containing polymeric substance can be formed into useful composite cathodes by introducing therein an active catholyte. Examples of such catholytes are vanadium oxides; $V_6O_{13}$ is preferred.

Use of such a composite cathode can provide in general an improved electrochemical cell in view of the continuity of both ionic and electronic pathways in the composite cathode. In addition, because of the difficulties of trying to ensure a homogeneous distribution of previously employed electronic conducting agents in previously used cathodes, cell manufacturing techniques are less complicated.

As with known cells, the composite cathode can usefully be employed in conjunction with a lithium, lithium alloy or other lithium-containing anodes, with an electrolyte, preferably a polymeric electrolyte and, if necessary, with relevant current collectors, for example nickel foil, and insulators. Batteries based on such cell constructions can be assembled by standard techniques.

To illustrate the invention, certain tests were conducted on a variety of cells, all of which had a lithium anode and an electrolyte comprising $(PEO)_9LiCF_3SO_3$.

The cathode of the various cells 1 to 7 contained $V_6O_{13}$ as active catholyte dispersed in the polymeric complex of the electrolyte above mixed with the complex:

$$(PEO)_xCu(CF_3SO_3)_2$$

where the value of "x" varies from cell to cell as shown below. A comparative cell "A" was also tested, which contained neither carbon nor the copper complex.

The cells were vacuum laminated and were cycled at 120° C. with a C/10 discharge rate and a C/20 charge rate.

TABLE

| Cell No. | Cathode Composition |
|---|---|
| 1 | 50% $V_6O_{13}$, 50% $PEO_9$:Li $CF_3SO_3$:$PEO_{20}$:$Cu(CF_3SO_3)_2$ |
| 2 | 50% $V_6O_{13}$, 50% $PEO_9$:Li $CF_3SO_3$:$PEO_{15}$:$Cu(CF_3SO_3)_2$ |
| 3 | 50% $V_6O_{13}$, 50% $PEO_9$:Li $CF_3SO_3$:$PEO_{10}$:$Cu(CF_3SO_3)_2$ |
| 4 | 50% $V_6O_{13}$, 50% $PEO_9$:Li $CF_3SO_3$:$PEO_8$:$Cu(CF_3SO_3)_2$ |
| 5 | 50% $V_6O_{13}$, 50% $PEO_9$:Li $CF_3SO_3$:$PEO_7$:$Cu(CF_3SO_3)_2$ |
| 6 | 50% $V_6O_{13}$, 50% $PEO_9$:Li $CF_3SO_3$:$PEO_6$:$Cu(CF_3SO_3)_2$ |
| 7 | 50% $V_6O_{13}$, 50% $PEO_9$:Li $CF_3SO_3$:$PEO_5$:$Cu(CF_3SO_3)_2$ |
| A | 50% $V_6O_{13}$, 50% $PEO_9$:Li $CF_3SO_3$ |

The results of these tests showed that the addition of the copper complex has a marked effect on cycle performance in terms of cell capacity retention on cycling even at the relatively small additions of Cell Nos. 1, 2 and 3; the tests showed that the cycling behaviour of Cells Nos. 4 to 7 is even better.

In all cases the results showed the Cells 1 to 7 using cathode material in accordance with the invention to be superior to the carbon free Cell A.

We claim:

1. A material which includes a complex of a salt formed between a metal ion capable of existing in at least two stable valency states or an aluminium ion together with a suitable anion and a solid plastics polymeric composition capable of forming a donor acceptor type bond with the metal or aluminium ion, wherein the material exhibits both ionic and electronic conductivities which are of the same order of magnitude as each other.

2. A material according to claim 1 in which the metal ion is selected from the group consisting of iron, nickel, cobalt, copper and a mixture thereof.

3. A material according to claim 2 in which the metal ion is copper.

4. A material according to claim 1 in which the anion is one of trifluoromethane sulphonate or perchlorate.

5. A material according to claim 1 in which the polymeric composition is one of polyethylene oxide and polypropylene oxide.

6. A material according to claim 5 in which the complex is formed between polyethylene oxide and copper trifluoromethane sulphonate.

7. A material according to claim 1 which also contains a lithium-ion containing polymeric substance.

8. A material according to claim 7 in which the lithium-ion containing polymeric substances is:

$$(PEO)_x:LiCF_3SO_3.$$

9. A material according to claim 8 in which a mixed complex $$(PEO)_x:LiCF_3SO_3:Cu(CF_3SO_3)_2$$

is formed.

10. A composite cathode comprising the material according to claim 6 in which an active catholyte is dispersed.

11. A composite cathode according to claim 10 in which the active catholyte is a vanadium oxide.

12. An electrochemical cell comprising the composite cathode of claim 10 together with a lithium-based anode and a polymeric electrolyte.

13. A material which includes a complex of a salt formed between a metal ion capable of existing in at least two stable valency states or an aluminium ion together with a suitable anion and a solid plastics polymeric composition capable of forming a donor acceptor type bond with the metal or aluminium ion, wherein the material exhibits both ionic and electronic conductivities and said electronic conductivity is at least equal to said ionic conductivity.

* * * * *